United States Patent
Hofmann et al.

(10) Patent No.: US 7,458,209 B2
(45) Date of Patent: Dec. 2, 2008

(54) SHIELDING COMPONENT, A HEAT SHIELD IN PARTICULAR

(75) Inventors: Dieter Hofmann, Wilhelmsdorf (DE); Bernd Ell, Grosshabersdorf (DE)

(73) Assignee: ElringKlinger AG, Dettingen/Erms (DE)

( * ) Notice: Subject to any disclaimer, the term of this patent is extended or adjusted under 35 U.S.C. 154(b) by 3 days.

(21) Appl. No.: 11/349,529

(22) Filed: Feb. 8, 2006

(65) Prior Publication Data

US 2006/0179827 A1    Aug. 17, 2006

(30) Foreign Application Priority Data

Feb. 11, 2005  (DE) ................. 10 2005 006 319

(51) Int. Cl.
*F01N 7/00* (2006.01)
(52) U.S. Cl. .......................... 60/322; 60/323
(58) Field of Classification Search .......... 60/322, 60/323; 137/375; 138/149
See application file for complete search history.

(56) References Cited

U.S. PATENT DOCUMENTS

| | | | | |
|---|---|---|---|---|
| 3,425,456 | A * | 2/1969 | Schibig .................. | 138/162 |
| 3,886,981 | A * | 6/1975 | Eliason .................. | 138/149 |
| 3,904,379 | A | 9/1975 | Oser | |
| 4,085,816 | A * | 4/1978 | Amagai et al. ............. | 180/89.2 |
| 4,182,122 | A * | 1/1980 | Stratton et al. ............. | 60/322 |
| 4,374,599 | A * | 2/1983 | Hurt .......................... | 292/270 |
| 4,612,767 | A * | 9/1986 | Engquist et al. ............. | 60/323 |
| 4,951,716 | A * | 8/1990 | Tsunoda et al. ............. | 138/162 |
| 5,158,114 | A * | 10/1992 | Botsolas ..................... | 138/149 |
| 5,709,249 | A * | 1/1998 | Okada et al. ................ | 138/162 |
| 6,026,846 | A * | 2/2000 | Wolf et al. .................. | 137/375 |
| 6,598,389 | B2 * | 7/2003 | Chen et al. ................... | 60/323 |

FOREIGN PATENT DOCUMENTS

DE     102 47 641 B3    1/2004

* cited by examiner

*Primary Examiner*—Thomas E Denion
*Assistant Examiner*—Diem Tran
(74) *Attorney, Agent, or Firm*—Roylance, Abrams, Berdo & Goodman, L.L.P.

(57) ABSTRACT

A shielding component, in particular a heat shield, has at least two shield components (10, 12) which can be connected to each other by a connection unit (14). Because the connection unit (14) has a guide (16) which enables adjustment of the relative positions of the individual shield components (10, 12) to each other and which is used for fastening in the adjusted position. A sliding heat shield concept arises in which, with a heat shield having several shield components, adaptation is possible on site to the geometrical conditions of engines and their add-on parts including exhaust systems. Effective sound damping and heat insulation can be produced in a wide area with only one shielding component and its shield components.

12 Claims, 1 Drawing Sheet

SHIELDING COMPONENT, A HEAT SHIELD IN PARTICULAR

FIELD OF THE INVENTION

The present invention relates to a shielding component, a heat shield in particular, having at least two shield components connected to each other by a connection unit.

BACKGROUND OF THE INVENTION

While the heat, such as that evolved by a cost-effective, performance-optimized diesel engine, for example, can be very low on the cylinder crankshaft housing, this low heat in no way applies to "hot zones" such as in manifolds, turbochargers, catalytic converters, etc. As a result of the increasingly compact design of engines, components which are not thermally "compatible" are coming to be in ever closer proximity. It is then necessary to use shielding components, such as heat shields, to protect adjacent heat-sensitive assemblies, such as sensors, fuel lines, pressure cells, body parts, and so forth from heat-generating engine components. The situation is also exacerbated by the compact design in that the high packing density of the assemblies constricts the cooling air flow in the engine compartment. Noise abatement measures can also contribute to the problem. For example, under certain circumstances plastic floor plates having the function of reducing the level of sound emerging from the engine compartment to the roadway can produce effective insulation whereby heat is trapped in the engine compartment. Because of their high surface temperature in some phases, catalytic converters are among the heat sources which may necessitate the use of protective shield barriers. A typical example is that of design measures such as positioning the catalytic converter in the immediate vicinity of the manifold. This design principle performs the function of rapid heat-up of the catalytic converter to reduce emissions in the cold start phase, and shifts a major source of heat into the engine compartment where a considerable number of assemblies are crowded in a tight space. Another reason for the growing importance of shielding components, such as heat shields, is the trend toward use of thermoplastics. Light and economical materials with their exceptional moldability are rapidly becoming common in the engine compartment, but require special attention in view of ambient temperatures generated at the application site in connection with other heat-generating engine parts ("New Materials and Development Tools for Protection from Heat", in MTZ 12/2001, Vol. 72, pp. 1044 et seq.).

DE 102 47 641 B3 discloses a shielding component, in particular in the form of a sound-damping structural component, as a component of a motor vehicle. In order to improve noise damping in the known shielding component, it has a shield body with a base edge as a shield component. The shield component can be fastened on the edge side by angular bracket legs within the engine compartment on stationary elements mounted in the compartment, and shields heat-generating engine components from heat-sensitive structural components.

The shield component in the disclosed design is arched in a U-shape in the central area, and is configured to be symmetrical for this purpose. The central U-shaped arched area undergoes transition on the edge side into edge areas of more pronounced curvature. The U-shaped arches on the two edge areas opposite each other are subsequently mounted as fastening means. The shield component has two layers of sheet metal, between which a sound-damping and/or heat-insulating layer extends. A border, in which the flanged edge of one cover layer covers the edge area of the other cover layer, is used for fastening the metal cover layers to each other. In order to reduce the weight, the shielding body may be made of aluminum or another light metal.

The disclosed solution is applied preferably to shield a coupling between a drive flange and a drive shaft from the sound of the body coming from the gearing and to exert a long-term effect through thermal radiation of an adjacent exhaust gas pipe.

Motor vehicle engines of identical design are currently used in a plurality of different vehicles. Based on the engine applications, however, increasingly modified add-on pieces are necessary, since their configuration is influenced for the most part by the overall installation situation (vehicle chassis). The structure and the configuration of the exhaust system, for example, are thus dependent on the type of engine, the output to be attained, and the exhaust gas classification to be achieved according to legal regulations. For an engine, this arrangement often yields several similar individual component systems which are dimensioned differently in terms of geometry, in particular in the form of exhaust gas systems with catalytic converters, as are likewise used at present in modern diesel engines in the form of so-called "soot particle burners."

When the above described disclosed solutions are used for these applications, a heat shield component which differs in terms of geometry must often be developed and formed for each engine and/or its components such as exhaust systems. This development increases the production effort and consequently costs. Due to the resulting diversity of shield components, complexity is also increased in motor vehicle production lines, especially due to the associated additional effort with respect to parts management and parts storage. Furthermore, mixing up of parts may be possible, especially when they are to be replaced by new parts within the scope of subsequent maintenance. Fundamentally nothing changes in the pertinent problem if especially for large shielding components several individual heat shield components are connected to each other by conventional connection units such as screw joints or spring clamps.

SUMMARY OF THE INVENTION

An object of the present invention is to provide an improved heat shield while retaining the advantages of prior designs, specifically to ensure very good sound damping and heat insulation, such that production, installation, and maintenance are simplified with a corresponding cost reduction.

This object is basically achieved by a shielding component where the connection unit has a guide means which enables adjustment of the relative positions of the individual shield components to each other and which is used for fastening in the adjusted positions. A sliding heat shield concept arises in which with a heat shield or shielding component having several shield components is adaptable on site to the geometrical conditions of engines and their add-on parts including exhaust systems. Effective sound damping and heat insulation can be effected in a wide area with only one shielding component and its shield components.

The present invention is characterized in that with only a few actions, it is possible in particular to make the shielding components larger or smaller relative to each other by a guide means as a part of the connection unit. In particular, very good adaptation of lengths to the parts to be shielded at the time is achieved. It is possible to adapt the size of the shielding component of the present invention with its individual shield components before installation to the circumstances, or to effect the pertinent adaptation directly in the assembly line, since the guide means enables very rapid relative adjustment of the position between the shield components. With the solution of the present invention, a type of kit of shield components can be implemented which allows adaptation possibilities within a wide scope and helps reduce the diversity of parts, so that overall in the development for tool production and parts management the labor and cost are distinctly reduced. Possible errors due to mix-ups occurring earlier can also be avoided in this way, viewed over the life cycle of the parts.

In one preferred embodiment of the shielding component of the present invention, the guide means in one of the shield components has at least one path of travel in the form of a slot. Another, in particular adjacent, shield component, with its guide part, engages and is movably guided in the slot. The guide part is made preferably from a fastening means such as a screw, rivet, or the like, which is guided in the slot.

It has been found to be especially advantageous in assembly if the shield component with its slot guide overlaps the other shield component on the edge side to form a limit stop. This arrangement makes it possible to relieve the path of travel in the form of the slot by one shield component on the edge side adjoining the limit stop of the other shield component when the shield dimensions are reduced, before the respective guide part (screw, rivet, etc.) reaches the end of the slot guide. This structure precludes pulling apart of the slot guide in any relative position of the shield components against each other.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figures 1, 2:
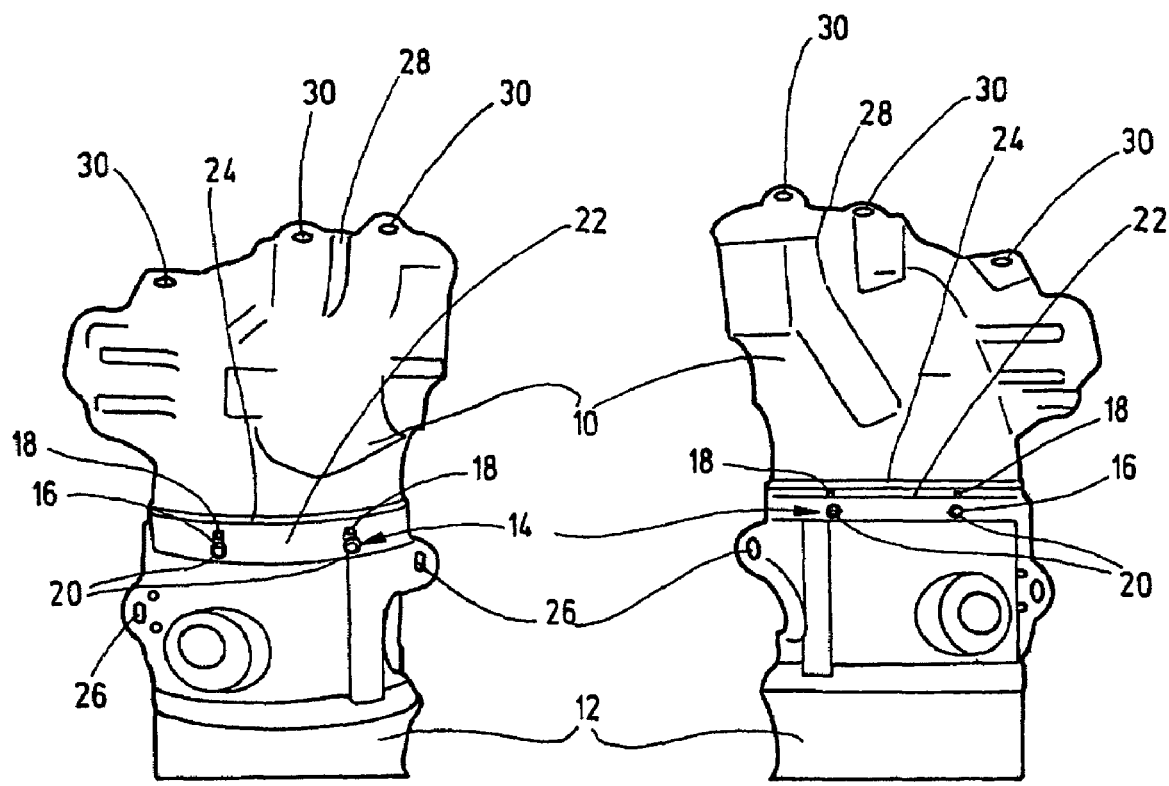
FIG. 1 is a schematic, not-to-scale perspective outside view of a shielding component according to an embodiment of the present invention.
FIG. 2 is a schematic, not-to-scale perspective inside view of the shielding component of FIG. 1.

The shielding component shown in the figures relates especially to a heat shield formed of two shield components 10, 12. These two shield components 10, 12 are connected to each other by a connection unit 14. The connection unit 14 has a guide means 16 which enables adjustment of the relative position of the individual shield components 10, 12 to each other and which is used for fastening in any adjusted position.

The guide means 16 in the upper shield component 10 has a path of travel along which the other, lower shield component 12 can be moved with at least one guide part. As the figures further show, the respective guide part engages the assignable path of travel and forms a fastening means for fastening the shield components 10, 12 in their relative position which they have assumed relative to each other.

In the embodiment shown in FIG. 1 and FIG. 2, the respective path of travel is defined by a slot guide 18 through which the assignable guide part extends. For this purpose, the respective guide part with an end-side projection overlaps the slot of the guide in the first shield component 10 and is retained with its other end in the second shield component 12 (compare FIG. 2). By preference, the guide part is a screw 20 or a rivet, the respective head part configured on the end side forming the indicated projection. In the configuration of the present invention, it is possible on the one hand to select the connection such that the two heat shield components can be moved against each other in the manner of frictional engagement with a low expenditure of force. An initially loose connection of the shield components 10, 12 against each other on-site is also possible, in particular at the installation site. After the shield components 10, 12 have assumed their relative positions relative to each other, a nonpositive rigid connection between them is established by the respective guide part as part of the connection unit 14. If a frictional connection is considered, this optionally permits compensation of the thermal expansion behavior of the individual heat shields in the form of shield components 10, 12. Thermal compensation can be achieved by the components 10, 12 being able to move unconstrained against each other, while still being fastened on each other during expansion.

As FIGS. 1 and 2 furthermore show, the shield components 10, 12 are designed as shell-like protective covers which in the installed state have a common longitudinal alignment along which, configured in parallel, the respective path of travel extends in the form of slot guides 18. In particular, the two slot guides 18 are configured in the edge-side arch area on both sides of the center bracket of the shield components 10, 12. Viewed in the direction of the axial or longitudinal alignment, an increase or decrease in the size of the shielding component results by the shield components 10, 12 being moved apart by pulling out from each other along their slot guides 18 or being pushed into each other in the opposite direction, respectively.

In addition to the illustrated axial pulling-out direction, in one embodiment, which is not shown, there can however also be another path of travel which enables adjustment of the relative position of the shield components 10, 12 to each other optionally in other directions, especially also in transverse directions. Furthermore, the respective shield component 10, 12 can be connected to at least one additional shield component (not shown) which is optionally provided with a comparable connection unit. Then with one shielding component, the relative positions of shield components of the same or different type can be adjusted relative to each other in the most varied directions.

The respective path of travel is guided in an overlap 22 of one shield component 10 which upon contact overlaps the other shield component 12 along a radial encompassing arch. While the overlap 22 of one shield component 10 ends on the edge side to the exterior, it forms a limit stop 24 opposite for the other shield component 12 along its free edge, the respective path of travel extending within the overlap 22. In this way, the respective slot guide 18 can be relieved by the limit stop 24 so that it is ensured that the guide part in the form of a screw 20 cannot strike the edge of the slot guide in the displacement direction (pushed-together state). Preferably, the limit stop 24 is implemented by a crimped-in edge on the hood-shaped shield component 10. Furthermore, the shield component 12, which has the respective guide part in the form of screws 20 on the edge side, has two other slot guides 26 for fastening the relative position of the shielding component relative to the vehicle components and/or engine components, such as catalytic converter exhaust systems (not shown). Additionally, the shield component 10, as viewed in the figures, in the upper area, has an encompassing edge 28, which, provided with through openings 30, forms additional fastening possibilities for the shielding component.

The respective shield component 10, 12 used is formed of a single-layer or multilayer formed part, in particular a formed sheet metal part. For a multilayer system, an insulating intermediate layer can be accommodated between the cover layers of sheet metal. In particular, it also becomes possible to connect single-layer shield components to multi-layer shield components. Even with very different thermal expansion behaviors, they maintain their adjusted positions relative to each other such that relative expansion to each other is possible by the respective path of travel or slot guide.

While one embodiment has been chosen to illustrate the invention, it will be understood by those skilled in the art that various changes and modifications can be made therein without departing from the scope of the invention as defined in the appended claims.

What is claimed is:

1. A shielding component for forming a heat shield for combustion engines, comprising:
    first and second shield components; and
    a connection coupling said first and second shield components to one another, said connection including a guide enabling adjustment of positions of said first and second shield components relative to one another and fixing of said first and second shield components in adjusted relative positions, said guide being a guide slot in said first shield component elongated along at least one adjustment movement path and at least one guide part extending in and movable in said guide slot along said adjustment movement path, said guide part having a projection at one end overlapping said guide slot and an opposite end retained in said second shield component.

2. A shielding component according to claim 1 wherein said shield components are shell shaped covers aligned along a common longitudinal axis parallel to said adjustment movement path.

3. A shielding component according to claim 1 wherein said second shield component comprises at least one elongated guide slot for adjustably fastening said second shield component to a vehicle component.

4. A shielding component according to claim 1 wherein each said shield component has multiple layers.

5. A shielding component according to claim 1 wherein each said shield component is a formed sheet metal part.

6. A shielding component according to claim 1 wherein each said guide part has smaller dimensions along the adjustment movement path than said guide slot.

7. A shielding component according to claim 1 wherein said guide part comprises a fastener for retaining said first and second shield components in the adjusted relative positions.

8. A shielding component according to claim 7 wherein said fastener is a screw with a head forming said projection and extending laterally beyond said guide slot on said one end thereof.

9. A shielding component according to claim 7 wherein said fastener is a rivet with a head forming said projection and extending laterally beyond said guide slot on said one end thereof.

10. A shielding component according to claim 7 wherein said fastener is a thread pin with a threaded nut forming said projection and extending laterally beyond said guide slot on said one end thereof.

11. A shielding component according to claim 1 wherein one of said shield components has an overlap extending over and contacting a portion of the other shield component to guide relative movement therebetween.

12. A shielding component according to claim 11 wherein said overlap ends at an edge on an exterior side of said one of said shield components, and forms a stop opposite a free edge of the other of said shield components; and
said adjustment movement path extends within said overlap.

* * * * *